(12) United States Patent
Breese

(10) Patent No.: US 7,748,645 B2
(45) Date of Patent: Jul. 6, 2010

(54) CONTROL HANDLE FOR A CROP SPRAYER

(75) Inventor: Kristy Breese, Sherburn, MN (US)

(73) Assignee: ACCO Corporation, Duluth, GA (US)

( * ) Notice: Subject to any disclaimer, the term of this patent is extended or adjusted under 35 U.S.C. 154(b) by 128 days.

(21) Appl. No.: 11/686,407

(22) Filed: Mar. 15, 2007

(65) Prior Publication Data

US 2008/0223954 A1    Sep. 18, 2008

(51) Int. Cl.
*A01G 25/09* (2006.01)
(52) U.S. Cl. .................. 239/172; 239/723; 239/159; 180/315; 180/334
(58) Field of Classification Search .......... 180/315, 180/320, 323, 324, 334, 900; 238/159–170, 238/172, 175, 723, 165; 248/218.4, 219.3, 248/219.4, 230.7; 280/727, 762, 763.1; 403/109.1, 403/109.6, 109.8
See application file for complete search history.

(56) References Cited

U.S. PATENT DOCUMENTS

| | | | | |
|---|---|---|---|---|
| 2,597,727 A | * | 5/1952 | Hanson | 239/164 |
| 3,160,347 A | * | 12/1964 | Ackley et al. | 239/159 |
| 3,231,198 A | * | 1/1966 | Ackley et al. | 239/168 |
| 4,647,241 A | * | 3/1987 | Weber | 403/18 |
| 5,520,335 A | * | 5/1996 | Claussen et al. | 239/104 |
| 5,938,282 A | * | 8/1999 | Epple | 297/217.3 |
| 7,152,812 B1 | * | 12/2006 | Johnson | 239/164 |
| 2006/0042857 A1 | * | 3/2006 | Catton et al. | 180/334 |

* cited by examiner

*Primary Examiner*—Len Tran
*Assistant Examiner*—Jason Boeckmann
(74) *Attorney, Agent, or Firm*—Hovey Williams LLP

(57) ABSTRACT

A crop sprayer, including: a chassis; a number of wheels which support the chassis; an engine for driving at least one of the number of wheels so as to propel said chassis; a chemical receptacle, supported by the chassis, for receiving and holding a chemical solution therein; a boom arm mounted to the chassis including a plurality of nozzles operable for dispersing chemicals; a control handle for controlling the position of the boom arm and the dispersion of the chemicals through at least a portion of the plurality of nozzles, wherein the control handle has an adjustable position to accommodate various size operators.

5 Claims, 3 Drawing Sheets

CONTROL HANDLE FOR A CROP SPRAYER

BACKGROUND OF THE INVENTION

1. Field of the Invention

The present invention relates to a control handle attached to a crop sprayer to control the normal operation thereof, which can be adjusted to a different position to accommodate a different driver position.

2. Description of Related Art

A crop sprayer is used to distribute chemicals, such as herbicides, pesticides, and fertilizers, over crops in a field during a spraying operation. The chemicals are held in a storage tank prior to being sprayed upon the field. In order to reduce bulk and weight of the chemicals, the chemicals are shipped from the manufacturer as concentrated chemicals. The concentrated chemicals must be diluted with water prior to being sprayed upon the field. To dilute the concentrated chemicals, the concentrated chemicals are loaded into the storage tank that has been partially filled with water.

The crop sprayer is a complex machine requiring an extensive control from a operator to operate properly. The operator must not only control the propulsion an direction of the crop sprayer but also the operation of the chemical distribution system including the rate and location of the chemical dispersion.

What is needed therefore is a simplified control handle that is inexpensive and easy to operate, and which can be adjusted to a different position to accommodate a different driver position.

BRIEF SUMMARY OF THE INVENTION

Briefly, described herein is a crop sprayer, including: a chassis; a number of wheels which support the chassis; an engine for driving at least one of the number of wheels so as to propel said chassis; a chemical receptacle, supported by the chassis, for receiving and holding a chemical solution therein; a boom arm mounted to the chassis including a plurality of nozzles operable for dispersing chemicals; a control handle for controlling the position of the boom arm and the dispersion of the chemicals through at least a portion of the plurality of nozzles, wherein the control handle has an adjustable position to accommodate various size operators.

Additionally, disclosed herein is a control handle for a crop sprayer comprising: an head including a plurality of switches; a base affixed to the head portion including one or more buttons; and a mounting system affixed to the base operable for being adjustably affixed to a support member, wherein the plurality of switches control a position of a boom affixed to the crop sprayer and the buttons control a dispersion of chemicals through one or more nozzles affixed to the boom.

These and other objects, features and advantages of the present invention will become more apparent upon reading the following specification in conjunction with the accompanying drawing figures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
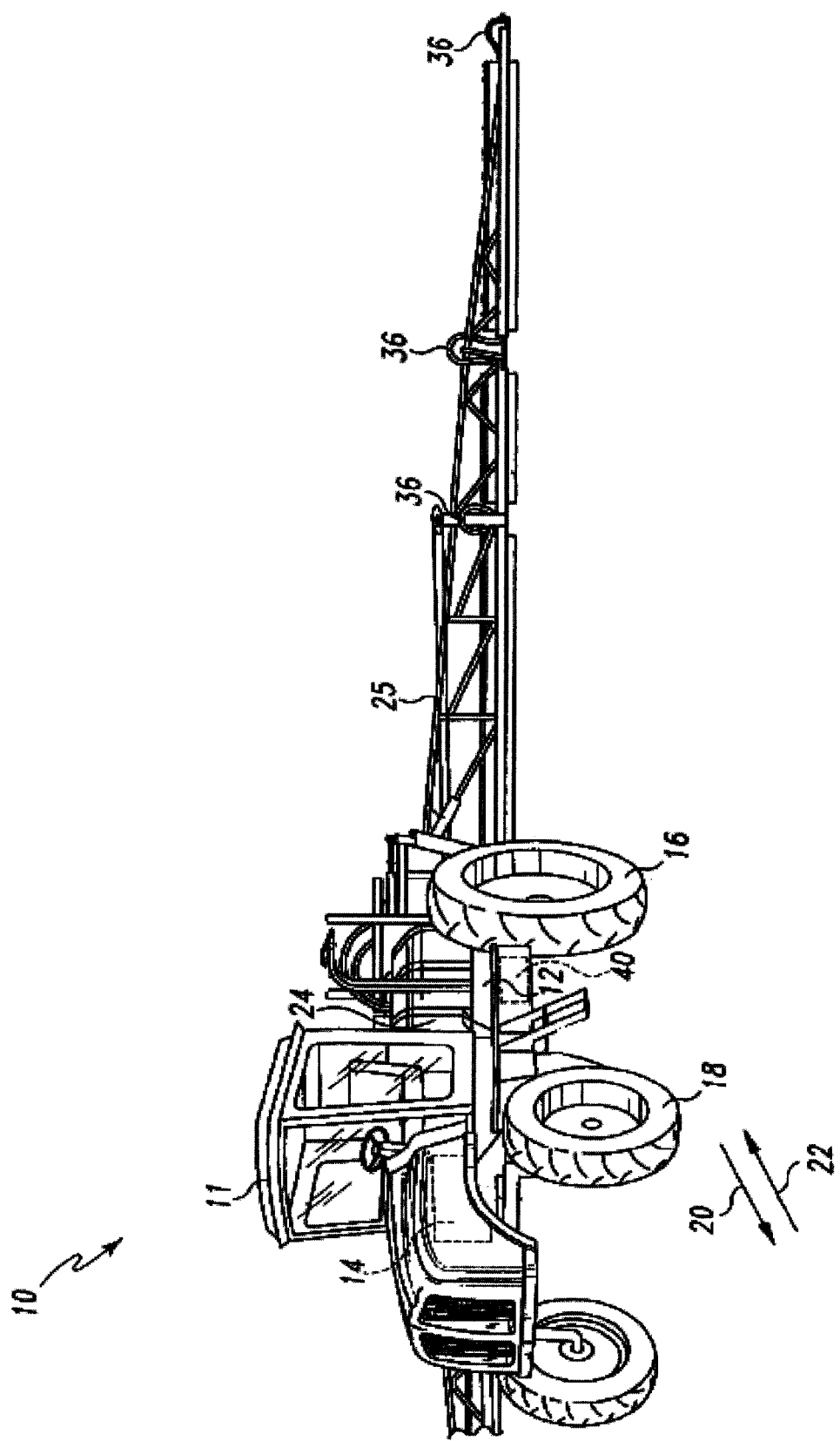
FIG. 1 illustrates a perspective view of a crop sprayer in accordance with exemplary embodiments of the invention.

The detailed description explains the preferred embodiments of the invention, together with advantages and features, by way of example with reference to the drawings.

DETAILED DESCRIPTION OF THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Exemplary embodiments of the present invention include a crop sprayer which includes: a chassis; a number of wheels which support the chassis; an engine for driving at least one of the number of wheels so as to propel said chassis; a chemical receptacle, supported by the chassis, for receiving and holding a chemical solution therein; a boom arm mounted to the chassis including a plurality of nozzles operable for dispersing chemicals; a control handle for controlling the position of the boom arm and the dispersion of the chemicals through at least a portion of the plurality of nozzles, wherein the control handle has an adjustable position to accommodate various size operators.

Referring now to FIG. 1, an exemplary embodiment of a crop sprayer 10 is illustrated. The crop sprayer 10 includes a frame or chassis 12. The chassis 12 may be of unitary construction or may include one or more pieces secured together. Generally, the chassis 12 is a support frame that spans most of the length of the crop sprayer 10 and provides a structure for mounting other components of the crop sprayer 10. The crop sprayer 10 also includes a cab 11 mounted on the chassis 12. The cab 11 houses an operator and a number of controls of the crop sprayer 10, including the control handle which is explained in more detail with reference to FIG. 2.

Continuing with reference to FIG. 1, an engine 14 is mounted on a forward portion of the chassis 12 in front of the cab 11. In one embodiment, the engine 14 may be a diesel engine that is commercially available from a variety of sources. In another exemplary embodiment, the engine 14 may be mounted on a rearward portion of the chassis behind the cab 11 and the engine may be any gasoline powered internal combustion engine. The engine 14 is used to provide energy for propulsion of the crop sprayer 10 and it may provide energy used to disperse the chemicals.

The chassis 12 is supported by a pair of rear wheels 16 and a pair of front wheels 18. In one embodiment, the rear wheels 16 are driven by the engine 14 so as to propel the crop sprayer 10 in the general direction of arrows 20 and 22. In particular, the engine 14 generates mechanical energy, which is transferred to the rear wheels 16 by a transmission, drive shaft, and rear differential. The front wheels 18 are operable to steer the crop sprayer 10. In exemplary embodiments, the propulsion of the chassis 12 and the direction of the chassis 12 are controlled by one or more operator controls that include, but are not limited to, a accelerator, a brake, and a steering wheel.

In another exemplary embodiment, the operator control for propulsion of the crop sprayer 10 may be integrated into the control handle. For example, the operator may push the control handle forward to increase the speed of the crop sprayer 10 and pull back the control handle to decrease the speed of the crop sprayer.

The crop sprayer 10 further includes a storage tank 24 that is used to store diluted chemicals, such as herbicides, pesticides, and fertilizers to be sprayed on a field. The storage tank 24 is mounted on the chassis 12, either in front of or behind the cab 11. In exemplary embodiments, the crop sprayer 10 may include more than one storage tanks 25 to store different chemicals to be sprayed on the field. The variety of stored chemicals may be dispersed by the crop sprayer 10 one at a time or different chemicals may be mixed and dispersed together in a variety of mixtures.

The crop sprayer 10 further includes a boom arm 25, which is operable to distribute the chemicals over a wide swath of a field, in particular, a number of nozzles 36 that are spaced along the boom arm 25 through which the chemicals are sprayed through as the crop sprayer 10 is propelled in the general direction of arrows 20 and 22 distributes the chemicals. The operator of the crop sprayer 10 uses a control handle, located in the cab 11, to control the location of the boom arm 25 and the dispersion of the diluted chemicals through the nozzles 36. The operator may also use the control handle to select which nozzles 36 the chemicals are dispersed through.

Figure 2:
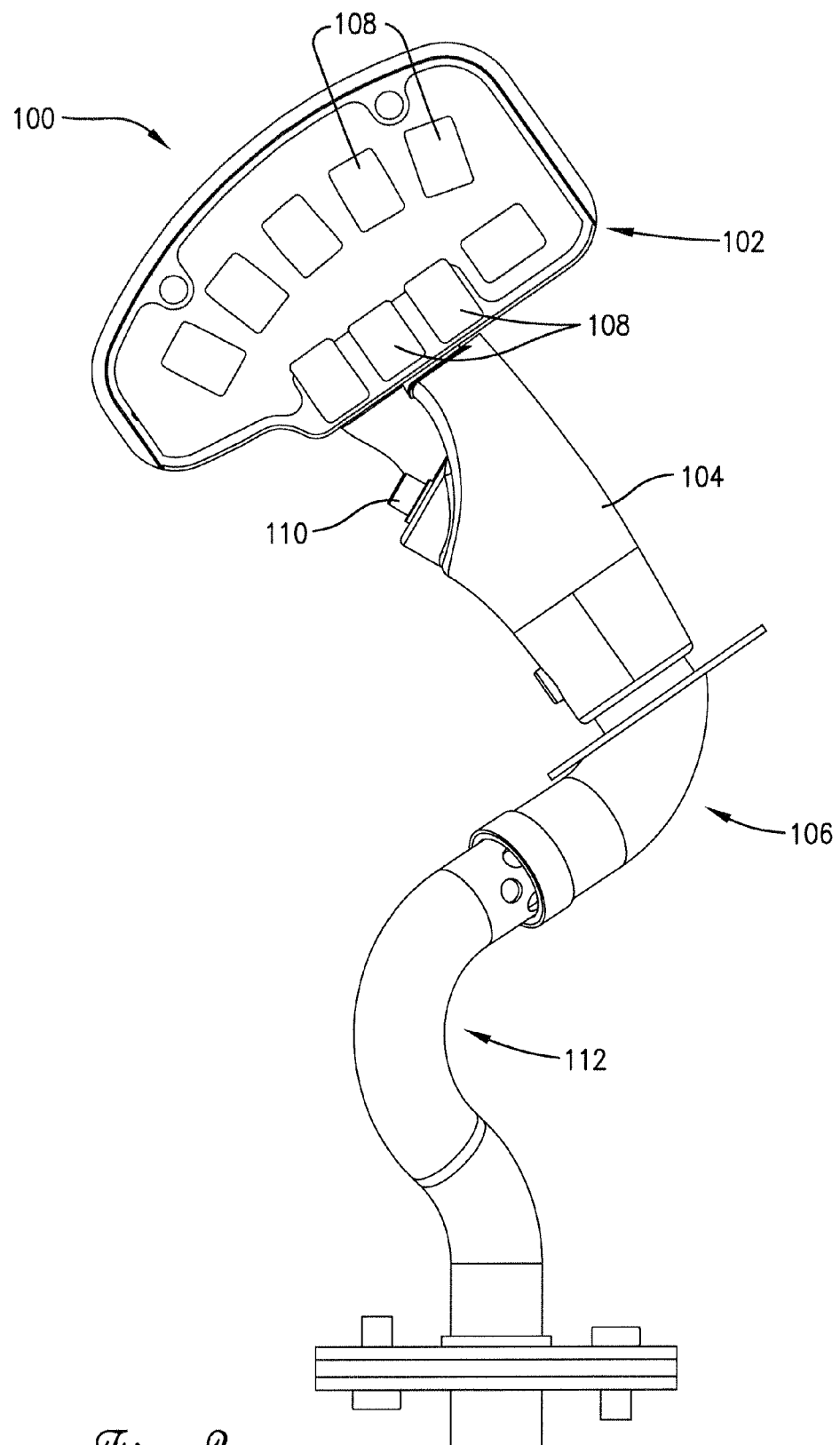
FIG. 2 illustrates a perspective view of a control handle in accordance with exemplary embodiments of the invention.

Turning now to FIG. 2, an exemplary embodiment of a control handle 100 is illustrated. The control handle 100 generally includes a head 102, a base 104, and a mounting system 106. The head 102 of the control handle 100 includes a plurality of switches 108 that are used to control the position of the boom arm 25. For example, the switches 108 may activate motors that actuate the vertical, horizontal, or radial position of the boom arm 25. In another example the switches 108 may activate a motor which expands or collapses the boom arm 25.

The base 104 of the control handle 100 includes on or more buttons 110 that can be used to control the dispersion of chemicals through the one or more nozzles 38 affixed to the boom arm 25. In addition, the buttons 110 may be used to disperse a foam marking material through one or more of the nozzles 38. The foam marking material is used by the operator to mark areas that have been treated with chemicals to avoid duplicate application or gaps in treatment. The base 104 serves as a grip and presents a grip axis.

Figure 3:
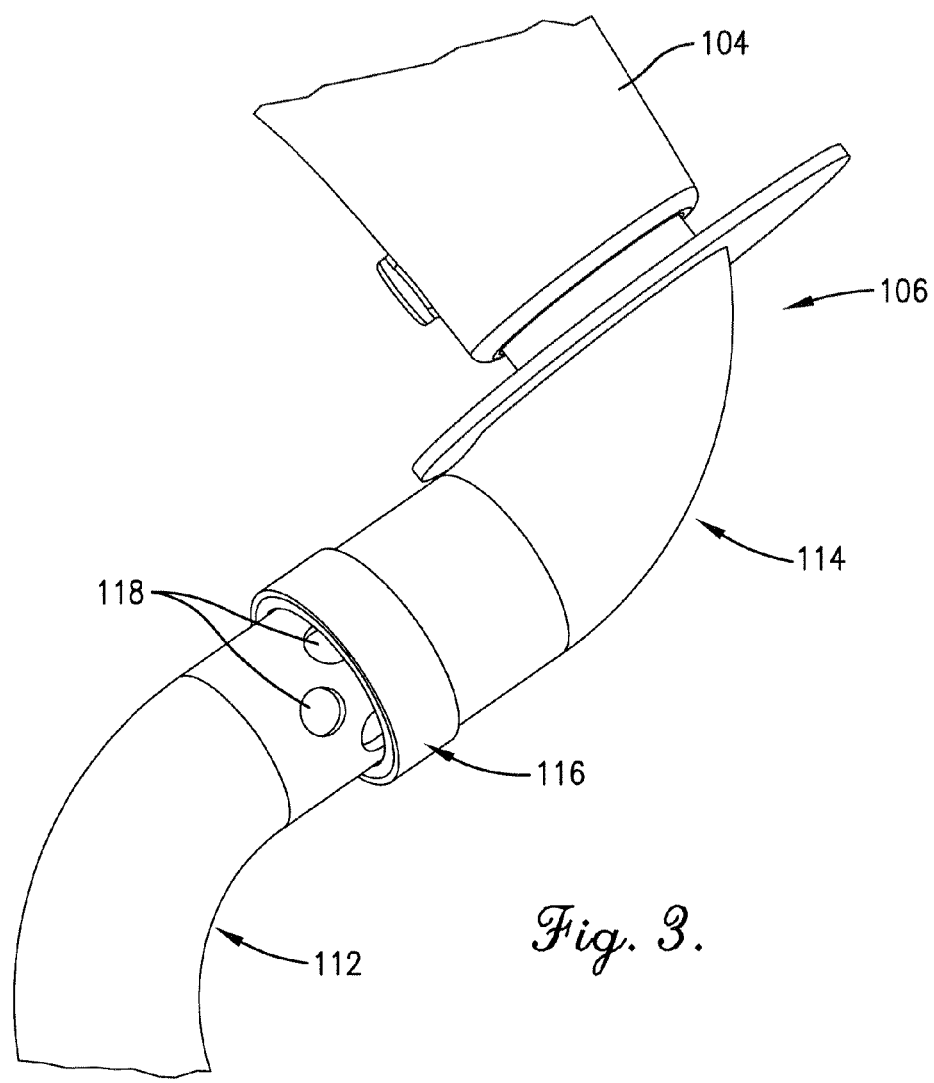
FIG. 3 illustrates a perspective view of a mounting system for the control handle of FIG. 2 in accordance with exemplary embodiments of the invention.

Turning now to FIG. 3, the base 104 is affixed to a support member 112 by the mounting system 106. The support member 112 presents a top end and an upright bottom end opposite the top end, with the top and bottom ends presenting corresponding top and bottom support axes disposed at different angles relative to each other. The mounting system 106 is designed to adjustably affix the base 104 to the support member 112, such that the location of the base 104 and the affixed head 102 can be adjusted to accommodate a variety of different driver positions. The mounting system 106 includes a receiving member 114 designed to receive the top end of the support member 112. The receiving member 114 presents an attachment axis. In one embodiment, the top end of the support member 112 is slidably disposed in the receiving member 114 such that the vertical position of the mounting system 106 can be adjusted. Thus, the receiving member 114 and the top end of the support member 112 are shiftably interconnected, with the attachment axis and the top support axis aligned for relative axial movement along and radial movement about the aligned axes. The grip and attachment axes are disposed at different angles relative to each other, with radial shifting between the receiving member 114 and the top end of the support member 112 causing tilting movement of the base 104 and axial shifting between the receiving member 114 and the top end of the support member 112 causing shifting of the base 104 along at least a horizontal direction. The mounting system 106 also includes an attachment device 116 designed to fix the position of the support member 112 relative to the receiving member 114. In exemplary embodiments, the support member 112 may include a plurality of apertures 118 that are axially and circumferentially spaced along the top support axis and are used in conjunction with the attachment device 116 to secure the receiving member 114 to the support member 112.

Figure 4:
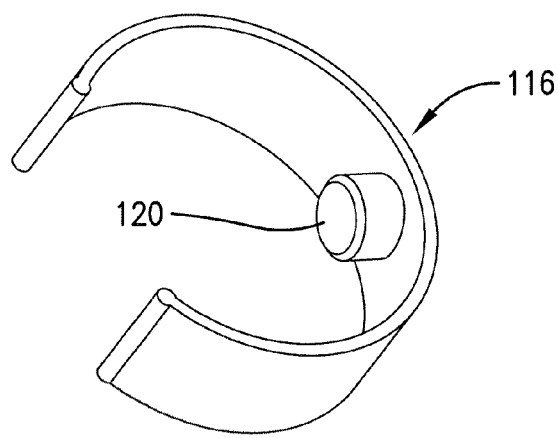
FIG. 4 illustrates a perspective view of a mounting bracket for the mounting system of FIG. 3 in accordance with exemplary embodiments of the invention.

Continuing with reference to FIG. 4, the attachment device 116 may be a plastic C-clip that includes a pin 120 disposed on an inner surface of the c-clip, which extends radially inward. The pin 120 is designed to selectively engage one of the plurality of aperture 118 on the support member 112. In exemplary embodiments, the apertures 118 are disposed such that the operator may adjust the position, horizontal and radial, of the receiving member 114 relative to the support member 112. The C-clip may be constructed of a flexible plastic type material to facilitate removal of the C-clip by the operator to reposition the control handle 100.

In other exemplary embodiments, the attachment device 116 may be a compression fitting disposed on the end of the support member 112 or the receiving member 114. For example, the compression fitting may be loosened to allow the receiving member 114 to be properly positioned for a particular operator at which point the compression fitting is tightened to fix the position of the receiving member 114 relative to the support member 112.

While the exemplary embodiments of the invention have been described, it will be understood that those skilled in the art, both now and in the future, may make various improvements and enhancements, which fall within the scope of the claims that follow. These claims should be construed to maintain the proper protection for the invention first described.

What is claimed is:

1. A crop sprayer, comprising:
   a chassis;
   a chemical receptacle, supported by the chassis, for receiving and holding a chemical solution therein;
   an adjustably positionable boom arm mounted to the chassis including a plurality of nozzles operable for dispersing the chemical solution;
   a control handle for controlling the position of the boom arm and the chemical dispersion through at least a portion of the plurality of nozzles,
   said control handle including a grip portion that is configured to be grasped by the operator and includes a plurality of electrical controls operable to provide selective operator adjustment of the boom arm and dispersion of the chemical solution, a support member disposed on the crop sprayer, and an attachment member attached relative to the grip portion and adjustably affixing the grip portion to the support member,
   said support member presenting a top end and an upright bottom end opposite the top end, with the top and bottom ends presenting corresponding top and bottom support axes disposed at different angles relative to each other,
   said grip portion presenting a grip axis and said attachment member presenting an attachment axis,
   said attachment member and the top end of the support member being shiftably interconnected, with the attachment axis and the top support axis aligned, for relative axial movement along and radial movement about the aligned axes, said grip and attachment axes being disposed at different angles relative to each other, with radial shifting between the attachment member and the top end causing tilting movement of the grip portion and axial shifting between the attachment member and the top end causing shifting of the grip portion along at least a horizontal direction, at least one of the attachment and support members including a plurality of axially and circumferentially spaced apertures, said control handle further including a fitting that includes a pin selectively engaging at least one of the plurality of apertures to permit horizontal and radial adjustment of the attachment member relative to the support member and thereby adjust the grip portion position to accommodate various size operators, said pin presenting a radial length that is less than half the cross-sectional dimensions of the support and attachment members.

2. The crop sprayer of claim 1, said fitting including a C-clip with the pin attached to the C-clip and extending radially inward therefrom.

3. The crop sprayer of claim 1, said grip portion including a head and a base.

4. The crop sprayer of claim 3, said controls including multiple switches operably mounted on the head and operable to provide selective adjustment of the boom arm position.

5. The crop sprayer of claim 4, said controls including a button operably mounted on the base and operable to provide selective adjustment of the dispersion of chemical solution.

* * * * *